United States Patent
Pattan et al.

(10) Patent No.: US 11,109,391 B2
(45) Date of Patent: *Aug. 31, 2021

(54) METHODS AND SYSTEMS FOR TRANSMISSION CONTROL IN NETWORK SUPPORTING MISSION CRITICAL SERVICES

(71) Applicant: Samsung Electronics Co., Ltd., Suwon-si (KR)

(72) Inventors: Basavaraj Jayawant Pattan, Bangalore (IN); Suresh Chitturi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

This patent is subject to a terminal disclaimer.

(21) Appl. No.: 16/906,379

(22) Filed: Jun. 19, 2020

(65) Prior Publication Data

US 2020/0322967 A1 Oct. 8, 2020

Related U.S. Application Data

(63) Continuation of application No. 16/308,989, filed as application No. PCT/KR2017/007889 on Jul. 21, 2017, now Pat. No. 10,708,928.

(30) Foreign Application Priority Data

Jul. 22, 2016 (IN) .............................. 201641025244
Jul. 20, 2017 (IN) .............................. 2016 41025244

(51) Int. Cl.
*H04W 72/10* (2009.01)
*H04L 12/851* (2013.01)
(Continued)

(52) U.S. Cl.
CPC ........ *H04W 72/10* (2013.01); *H04L 47/2433* (2013.01); *H04W 4/10* (2013.01); *H04W 4/90* (2018.02); *H04L 47/36* (2013.01)

(58) Field of Classification Search
None
See application file for complete search history.

(56) References Cited

U.S. PATENT DOCUMENTS

| 6,295,284 | B1 * | 9/2001 | Maggenti | ............... H04W 84/08 |
| | | | | 370/328 |
| 2003/0235184 | A1 * | 12/2003 | Dorenbosch | ........ H04L 65/4038 |
| | | | | 370/352 |

(Continued)

FOREIGN PATENT DOCUMENTS

| WO | 2016/003157 A1 | 1/2016 | |
| WO | 2016/006908 A1 | 1/2016 | |
| WO | WO-2016060471 A1 * | 4/2016 | ............ H04W 76/50 |

OTHER PUBLICATIONS

3GPP, 3GPP TS 23379 V14.1.0 (Mar. 2017), 3rd Generation Partnership Project; Technical Specification Group Services and System Aspects; Functional architecture and information flows to support Mission Critical Push to Talk (MCPTT); Stage 2 (Release 14); 650 Route des Lucioles—Sophia Antipolis Valbonne—France, Mar. 2017.

(Continued)

*Primary Examiner* — Mohammed Rachedine
(74) *Attorney, Agent, or Firm* — Jefferson IP Law, LLP

(57) ABSTRACT

A method and a system for transmission control in a network supporting mission critical (MC) services are provided. The method includes associating a predefined priority to a data transmission request from a communication device, availing MC services, based on type of the data transmission request. The type of the data transmission request is classified in at least one arbitration category. Further, the method includes (Continued)

managing flow of data associated with the data transmission request in the network based on the associated predefined priority.

20 Claims, 6 Drawing Sheets

(51) Int. Cl.
*H04W 4/90* (2018.01)
*H04W 4/10* (2009.01)
*H04L 12/805* (2013.01)

(56) References Cited

U.S. PATENT DOCUMENTS

| | | | |
|---|---|---|---|
| 2007/0281723 A1 | 12/2007 | Chotai et al. | |
| 2013/0165171 A1 | 6/2013 | Pai et al. | |
| 2016/0381692 A1* | 12/2016 | Hareuveni | H04W 72/10 370/329 |
| 2017/0230809 A1* | 8/2017 | Dm | H04M 3/5116 |
| 2017/0310761 A1* | 10/2017 | Enomoto | H04L 67/14 |

OTHER PUBLICATIONS

ETSI, LTE; Mission Critical Push to Talk (MCPTT) media plane control; Protocol specification, 3GPP TS 24.380 version 13.0.2 Release 13, 650 Route des Lucioles—Sophia Antipolis Valbonne—France, May 11, 2016 (http://http://www.etsi.org/deliver/etsi_ts/124300_124399/124380/13.00.02_ 60/ts_124380v130002p.pdf).

* cited by examiner

[Fig. 1]
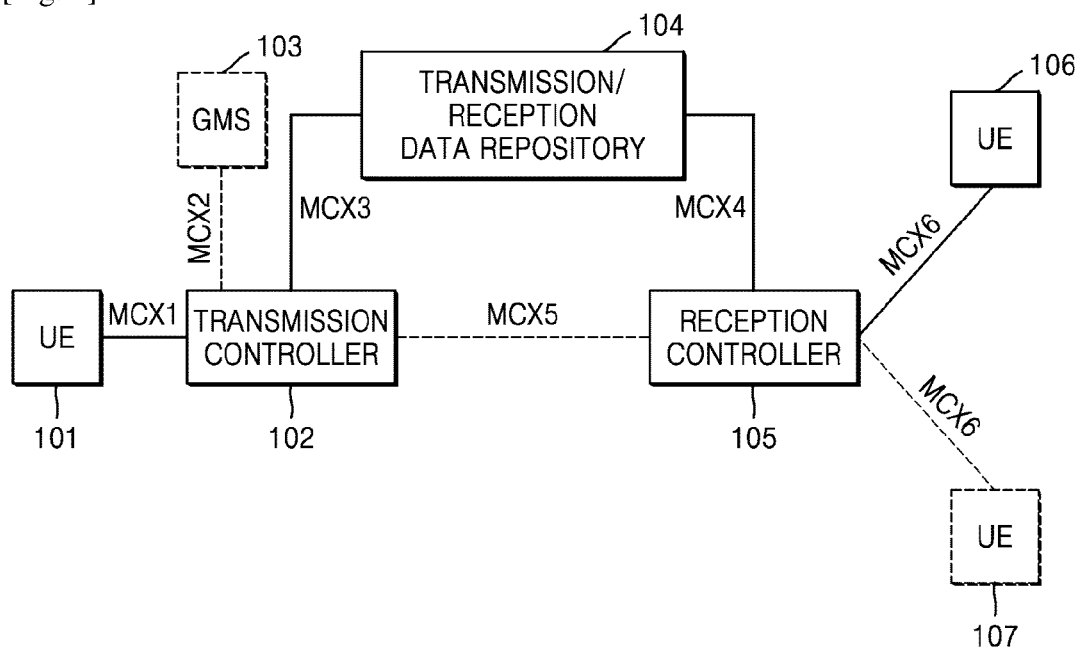

[Fig. 2]
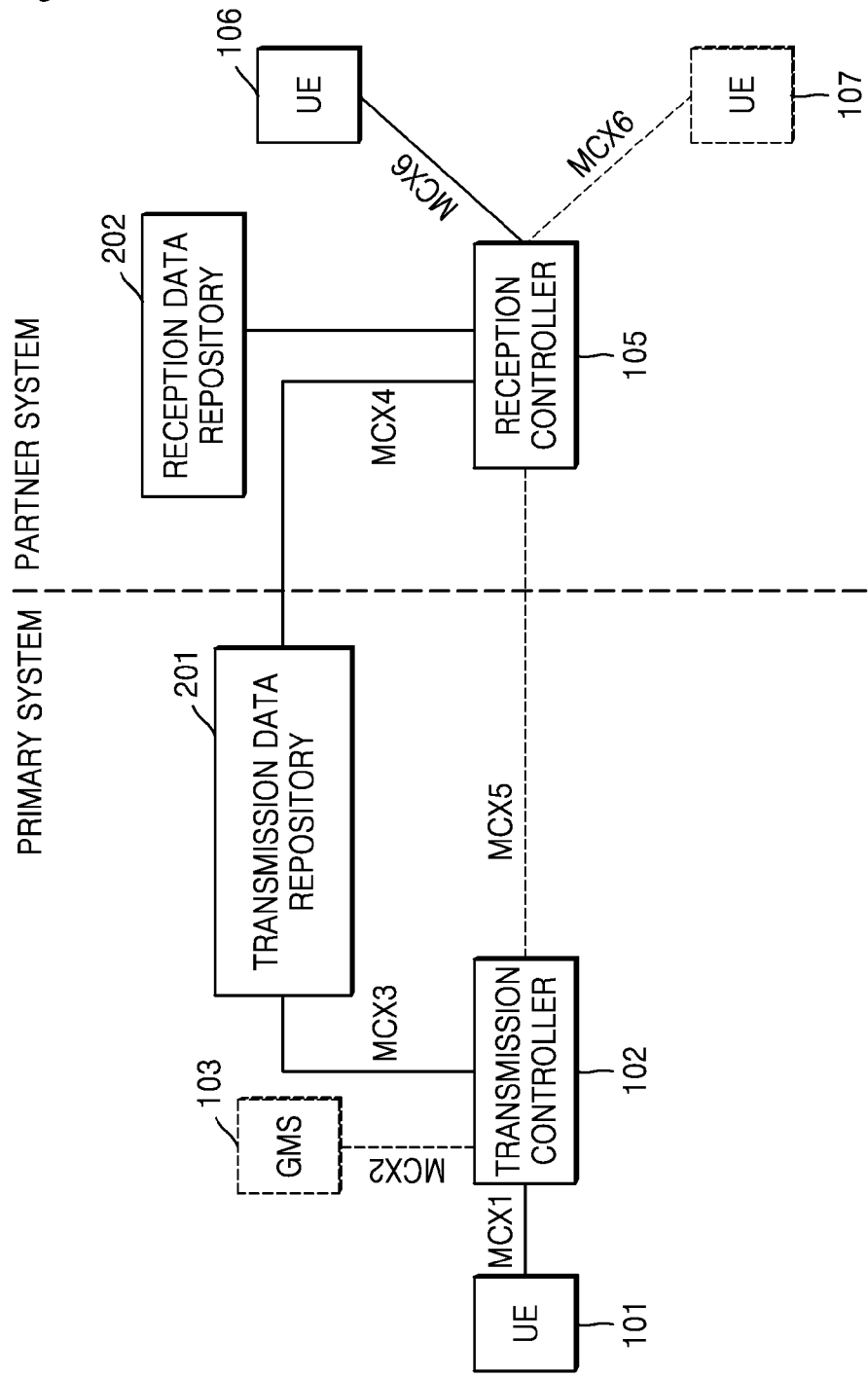

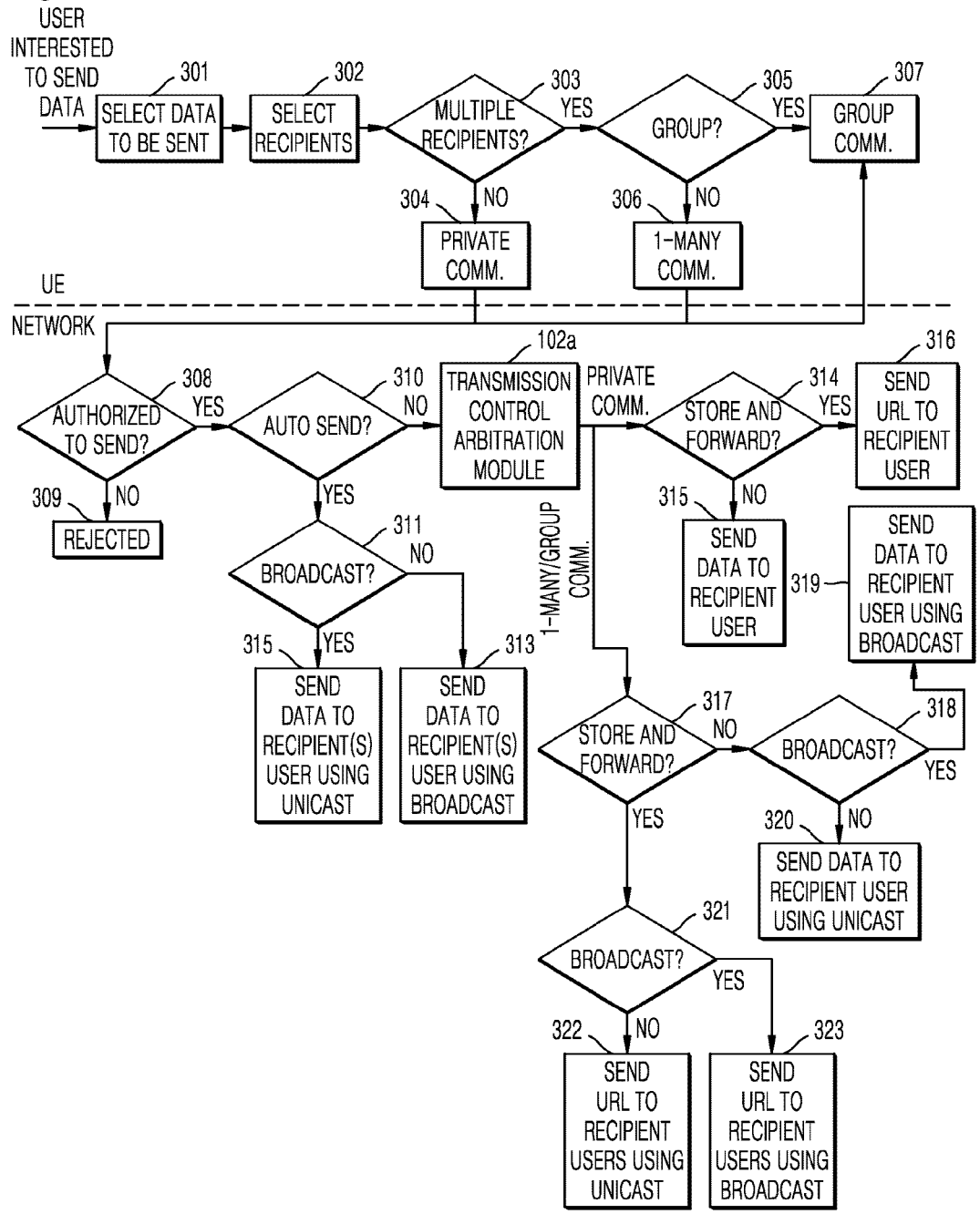

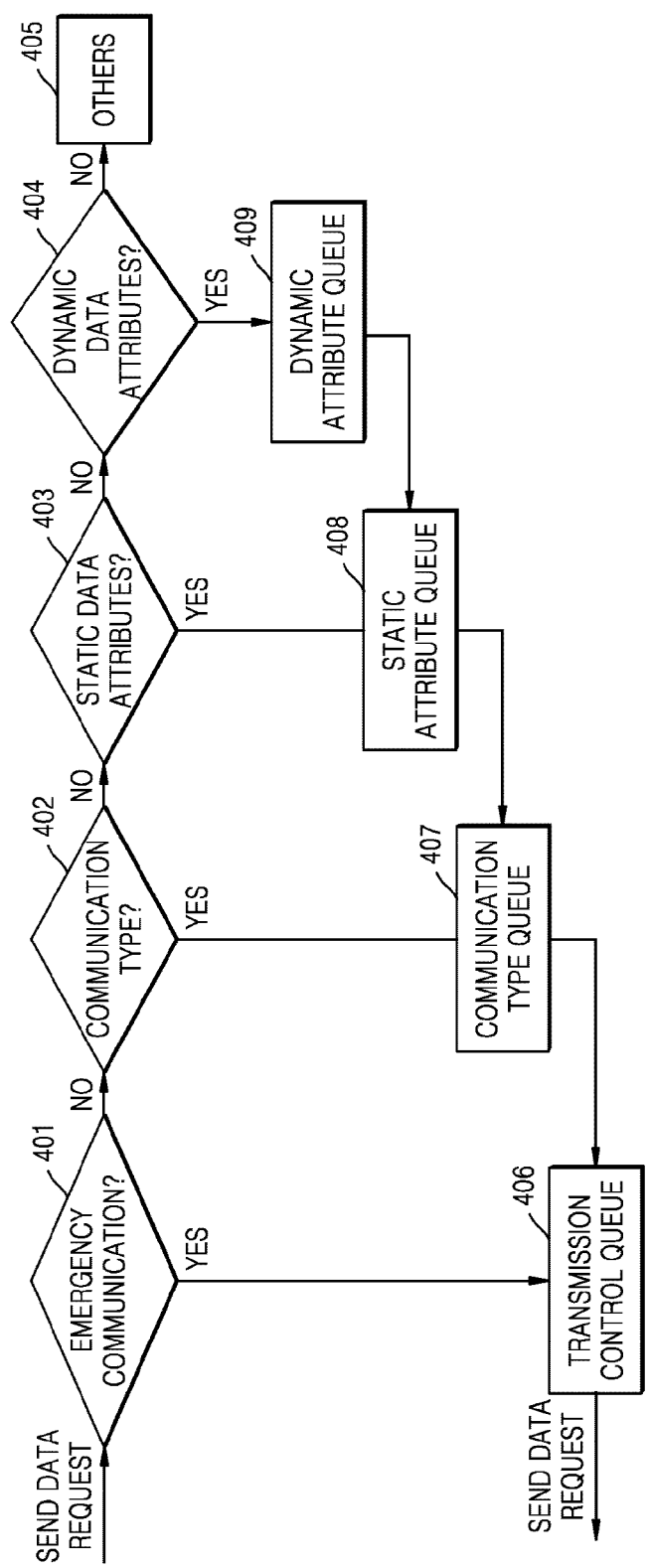
[Fig. 4]

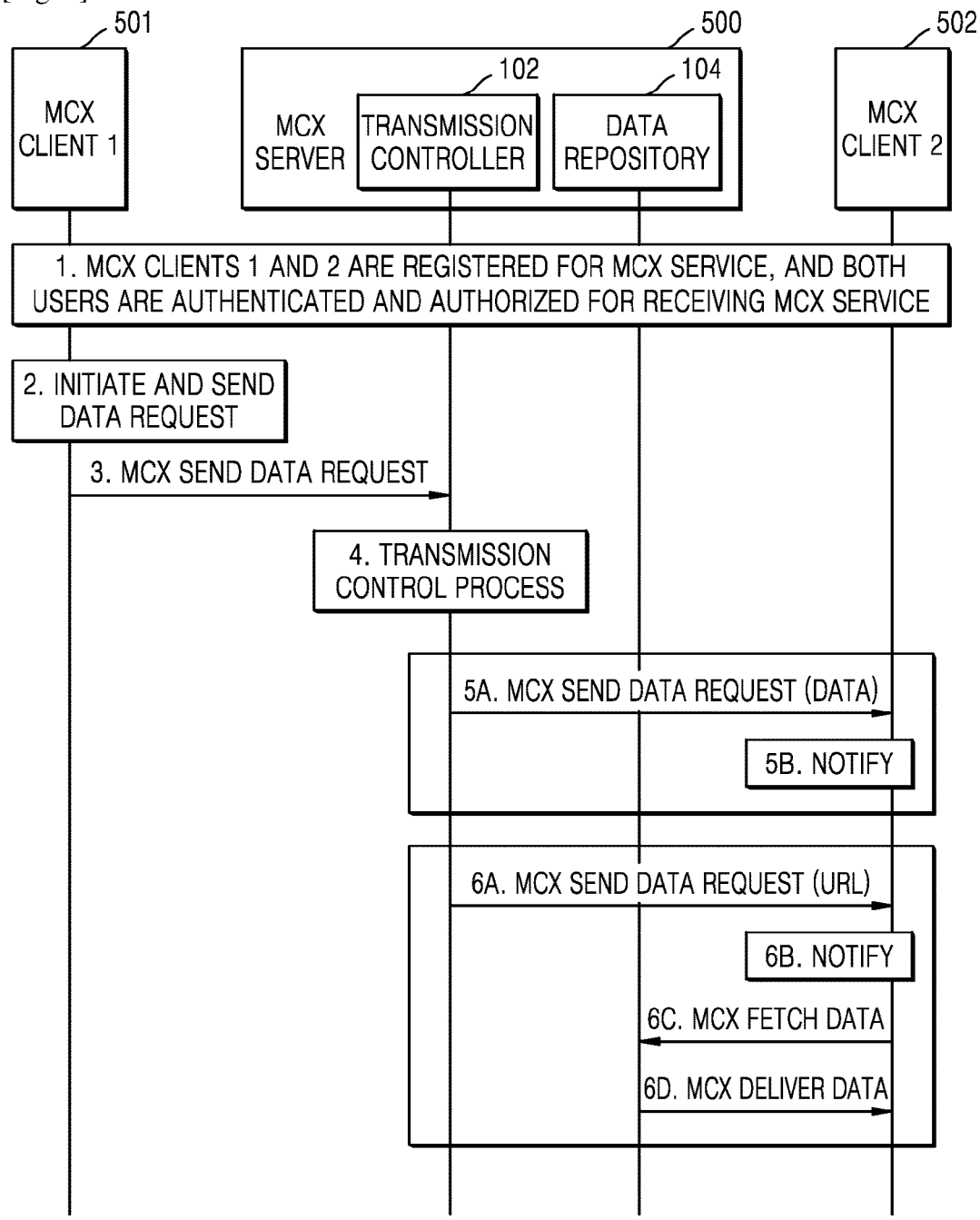

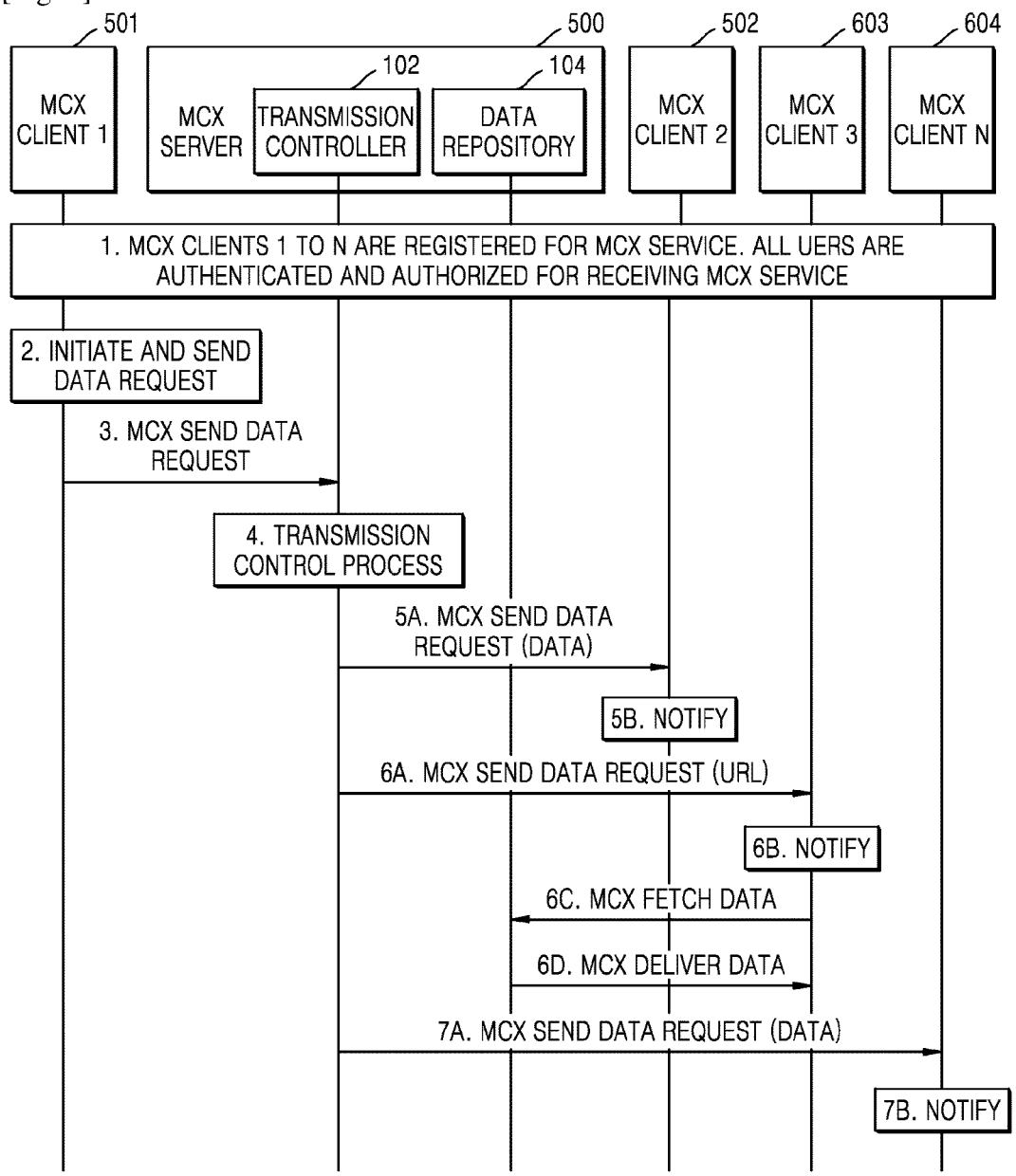

METHODS AND SYSTEMS FOR TRANSMISSION CONTROL IN NETWORK SUPPORTING MISSION CRITICAL SERVICES

CROSS-REFERENCE TO RELATED APPLICATION(S)

This application is a continuation application of prior application Ser. No. 16/308,989, filed on Dec. 11, 2018, and which is a U.S. National Stage entry under 35 U.S.C. § 371 of an International application number PCT/KR2017/007889, which was filed on Jul. 21, 2017, and which was based on and claimed priority under 35 U.S.C § 119(a) of an Indian provisional patent application number 201641025244, filed on Jul. 22, 2016, and of an Indian complete patent application number 2016 41025244, filed on Jul. 20, 2017, in the Indian Intellectual Property Office, the disclosure of each of which is incorporated by reference herein in its entirety.

BACKGROUND ART

1. Field of the Invention

Embodiments herein relate to mission critical services, and more particularly to methods and systems for transmission control in a network supporting Mission Critical (MC) services.

2. Description of the Related Art

Mission Critical (MC) services, for example, Mission Critical Push-to-Talk (MCPTT), are designed to provide one-to-one, one-to-many, and group communications between users. In MCPTT, the voice communication between multiple users is arbitrated using a floor control mechanism such that only one user can speak at a particular time period to avoid users to talk over each other. MCPTT users such as public safety community, government, transport community, business community, and so on, also expect mission critical services to include media beyond voice, i.e. data and video applications.

DISCLOSURE

Technical Problem

The principal object of the embodiments herein is to disclose methods and systems for transmission control in a network supporting Mission Critical (MC) services, such as mission critical data services and mission critical video services.

Another object of embodiments herein is to disclose a functional model for transmission control, transmission control process, transmission control arbitration and associated procedures which support one-to-one, one-to-many, and, group video and data communications in a network supporting Mission Critical (MC) services; including congestion control, queuing, and arbitration mechanisms.

Technical Solution

Methods and systems for transmission control in a network supporting Mission Critical (MC) services are provided.

A method includes associating a predefined priority to a data transmission request from a communication device, availing MC services, based on type of the data transmission request. The type of the data transmission request is classified in at least one arbitration category. Further, the method includes managing flow of data associated with the data transmission request in the network based on the associated predefined priority and the arbitration category.

Advantageous Effects

As described above, various embodiments of the present disclosure provide mechanisms to design an effective transmission control system to support mission critical data and video services.

DESCRIPTION OF DRAWINGS

These and/or other aspects, features and attendant advantages of the present disclosure will become apparent and more readily appreciated from the following detailed description, taken in conjunction with the accompanying drawings, in which like reference numerals refer to like elements, and wherein:

FIG. 1 depicts a high-level functional model architecture for transmission control and arbitration of transmission requests within a single Mission Critical (MC) System, according to embodiments as disclosed herein;

FIG. 2 depicts a high-level functional model architecture for transmission control and arbitration of transmission requests across multiple MC systems, according to embodiments as disclosed herein;

FIG. 3 depicts an example transmission control process, according to embodiments as disclosed herein;

FIG. 4 depicts an example of transmission control arbitration i.e. the process of ordering of priorities associated with different types of data transmission requests, through a transmission control queue, according to embodiments as disclosed herein;

FIG. 5 depicts signaling control procedures for transmitting a data transmission request and associated data for one to one communication, by an MCX client to another MCX client, according to embodiments as disclosed herein; and FIG. 6 depicts signaling control procedures for transmitting a data transmission request and associated data for one to many or group communication, by an MCX client to multiple MCX clients, according to embodiments as disclosed herein.

BEST MODE

Accordingly the embodiments herein provide methods and systems for transmission control in a network supporting Mission Critical (MC) services. A method includes associating a predefined priority to a data transmission request from a communication device, availing MC services, based on type of the data transmission request. The type of the data transmission request is classified in at least one arbitration category. Further, the method includes managing flow of data associated with the data transmission request in the network based on the associated predefined priority and the arbitration category.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

MODE FOR INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose systems and methods for transmission control process and arbitration in a network in order to support Mission Critical (MC) data and MC video services in the network. Embodiments disclosed herein include a functional model for transmission control, transmission control process, transmission control arbitration and associated procedures supporting one to one, one to many and group video and data communications, including congestion control, queuing, and arbitration mechanisms.

The embodiments herein achieve regulation of data and voice transmissions from a plurality of users, accessing mission critical services, by providing a transmission control arbitration mechanism. The regulation achieved by the transmission control mechanism enables timely transmission of relevant data especially when multiple simultaneous data transmission requests are made, which may result in network congestion. The embodiments can prevent loss of mission critical data, enable efficient utilization of bandwidth, and so on, in events of simultaneous transmission from the plurality of users either in one-to-one or one-to-many communication in the context of mission critical services.

Referring now to the drawings, and more particularly to FIGS. 1 through 6, where similar reference characters denote corresponding features consistently throughout the figures, there are shown preferred embodiments.

FIG. 1 depicts high-level functional model architecture for transmission control and arbitration of transmission requests within a single MC System, according to embodiments as disclosed herein. The system comprises of entities such as at least one UE 101, 106, and 107; and network entities such as transmission controller 102, a reception controller 105, a Group Management Server (GMS) 103 and a data repository 104 (that may be used for storage of communication data (for example, mission critical data, video content)).

In an embodiment, the UE (101, 106, and 107) can be at least one of but not restricted to a mobile phone, a smart phone, a tablet, a phablet, a Personal Digital Assistant (PDA), a laptop, a computer, a wearable computing device, an IoT (Internet of Things) device, a wearable device (for example, smart watch, smart band), a vehicle infotainment system, any other electronic device which can establish a wireless communication with at least one other electronic device, and so on.

The functional model architecture may be used for one-to-one, one-to-many, and group communications. The transmission controller 102 can receive data transmission requests from the UE 101 through a reference point MCX1, and apply an arbitration logic based on the type of a received data transmission request. The type of the received data transmission request can be categorized with at least one arbitration category. Examples of the arbitration category can be, but not limited to, automatic or manual transmission, emergency communication type (normal or emergency or imminent peril), communication type (private or 1-many or group), static data attribute (group priority, user priority), dynamic data attribute (user location, content type, content quality, content size, concurrency), and so on. Each of the data transmission requests may also be categorized into multiple arbitration categories such as and not limited to emergency communication type, communication type, static data attribute and dynamic data attribute, wherein the static data attributes of arbitration category refers to factors such as group priorities and user priorities, and so on. On the other hand, the dynamic category relates to factors such as user's location, content quality, content type, concurrent requests from the user, and so on. The categorization may differ across deployments and may include additional factors. The transmission controller 102 may interact with the GMS 103 through the reference point MCX2 when the request for transmission is targeted to a group, to resolve the group members for determining the recipients of the data transmission.

Depending on the result of the arbitration logic within the transmission controller 102, the data transmission request may be immediately processed and the content may be delivered to the intended recipient UE 106 through reference points MCX5 and MCX6. If the request is not immediately processed due to reasons such as the data size exceeding the "auto-send" size set by the administrator or dispatcher, the data may get queued or stored in a data repository 104 as shown by the reference point MCX3. The stored request data may contain attributes such as the content ID, sender ID, recipient(s) ID, expiration time of the data, and so on.

The reference to the stored information is sent to the reception controller 105 through MCX5 reference point. The reception controller 105 can determine and apply the policy for content delivery to the recipient UE 106. In the case of "auto-receive" it may be beneficial to not apply any policy, but deliver the content in real-time. However, when then information is not critical to be delivered in real-time, the reception controller 105 retrieves the data from the data repository 104 (as shown by MCX4 reference point) and deliver the data, from the data repository 104, to the recipient UE 106 through MCX6 reference point. The data that is delivered to the recipient UE 106 may be at least one of a Universal Resource Locator (URL), a reference representing the actual transmission data, or the actual data itself. This may be determined either by the user's preference, a policy configured by the administrator on the reception controller 105 or dynamically managed by the administrator in an ad-hoc manner depending on the circumstance.

The transmission controller 102 and the reception controller 105 are herein described are logically entities and the implementations may combine them into a single physical entity, based on the deployment models. In an example, the transmission controller 102 and the reception controller 105 may be located within service specific servers such as MC data server or MC video server.

FIG. 2 depicts high-level functional model architecture for transmission control and arbitration of data transmission requests across multiple MC systems, according to embodiments as disclosed herein. The key difference between a single system (as depicted in FIG. 1) and a multiple system (as depicted in FIG. 2) is that handling of the reception controller 105 may vary. In an example, the reception controller 105 in the partner system may have its own database, i.e., reception data repository 202 for storing data and reception delivery policy of the reception controller 105 may be applied. In particular, when the transmission data is received from the primary system, the reception controller 105 in the partner system may either auto deliver or store the data in the reception data repository 202, as depicted with the reference point MCX7. In another embodiment, when the data for transmission, is received from the primary system, with data stored in the transmission data repository 201, the UE (106 or 107) in the partner system may retrieve the data from the primary system data repository (transmission data repository 201) while the reception delivery policy is controlled by the partner system.

FIG. 3 depicts an example transmission control process, according to embodiments as disclosed herein. The transmission control process can be understood as comprising of two parts, a first part performed by a UE 101 and the second part performed by the network. The first part, performed by the UE 101, is triggered by user interest to send data. The user of the UE 101 selects the data (301), which is intended to be sent to selected recipient(s). The user can select (302) one or more (303) intended recipients to receive the data. If the user selects a single user as the intended recipient, then a private communication (304) is initiated for sending a data transmission request. If the user selects multiple users as the intended recipients, then 1-many communication is initiated (306) for sending the data transmission request. If the user selects a group (305) as the intended recipient, then group communication is initiated (307) for sending the data transmission request.

Once the data transmission request from the originating user is received, the network determines whether the user is authorized to initiate transmission of data (308). If the user is not authorized, the data transmission request is rejected (309) and the originating user is notified. Else, the data size from the received data transmission request is checked to see if the data exceeds a pre-configured size of an Auto-Send (310). The administrator can perform the pre-configuration (of the pre-configured size). If the data size is less than or equal to the predefined Auto-Send size then the network determines whether to send the data as unicast or broadcast (311), depending on whether the broadcast channel is active and appropriate to be used. Although the data is sent as unicast (312) or broadcast (313), based on state of the broadcast channel, there can be a reception controller 202, which determines whether the size of the received data is less than a pre-configured Auto-Receive size. If the size of the received data is greater than the Auto-Send size, then the data transmission request is sent to a Transmission Control Arbitration (TCA) module 102a. The TCA 102a can be a part of, or independent of the transmission controller 102. The TCA 102a determines the position of the data transmission request on a transmission control queue 406. The data transmission request received on the transmission control queue is further processed depending on whether the data transmission request is for private communication, or 1-many communication or group communication.

If the data transmission request is for private communication, the embodiments include determining whether the data associated with the data transmission request can be directly sent or the data needs to be stored and sent (314). The determination is based on the maximum data size of the data, which can be pre-configured. If the size of the data is less than or equal to maximum data size, then the data is sent directly (315). If the size of the data is more than the maximum data size, then a reference is generated (URL) and transmitted (316), which is stored in the transmission/reception data repository 104 or the transmission data repository 201. The recipient user can retrieve the data stored in the transmission/reception data repository 104 or the reception data repository 202 using the reference URL.

If the data transmission request is for 1-many or group communication, the embodiments include determining whether the data associated with the data transmission request can be directly sent (store and forward 317). The data can be directly sent based on a maximum data size (different from the maximum data size for private communication), which can be pre-configured. If the size of the data is less than or equal to maximum data size, then the data is sent directly. The data is sent through a broadcast channel (319) if the broadcast channel (318) is active, else the data is sent through the unicast channel (320). If the size of the data is more than the maximum data size, then a reference is generated (URL) and transmitted (unicast 322 or broadcast 323), which is stored in the transmission/reception data repository 104 or the transmission data repository 201. The recipient user can retrieve the data stored in the transmission/reception data repository 104 or the reception data repository 202 using the reference URL.

FIG. 4 depicts an example of transmission control arbitration i.e. the process of ordering of priorities associated with different types of data transmission requests, through a transmission control queue 406, according to embodiments as disclosed herein. The TCA 102a may receive multiple data transmission requests from multiple UEs. A predefined priority, to access MC services in the network, is associated with each data transmission request based on the type of the data transmission request. The priorities of the different types of data transmission requests are defined in a pre-defined order, which is stored in the transmission control queue in the TCA 102a. The TCA 102a applies an arbitrator policy to determine the order in which the different types of data transmission requests need to be placed in the transmission control queue, in the TCA 102a. The transmission control queue is the primary queue responsible for processing the data transmission requests prior to transmitting data associated with the data transmission requests to the receiving entity or user.

In an embodiment, the order in which the different types of data transmission request are placed in the transmission control queue may be based on arbitration category such as: emergency communication 401 (example: imminent peril or emergency), communication type 402 (example: private, 1-many, group), static data attribute 403 (example: group priority, user priority), dynamic data attributes 404 (example: user location, content type), others 405 (factors that are outside the listed factors above which may be deployment specific), and so on.

In an embodiment, if the type of data transmission request is emergency communication 401, then the TCA 102a may place the data transmission request with the type emergency communication 401 as first in the transmission control queue due to the high importance. As depicted in FIG. 4, each category may have its own category specific queue (406, 407, 408 and 409) to handle multiple requests that fall within the said category. The processing of the category specific queues (406, 407, 408 and 409) can be in a 'first come first serve' basis. However, the final transmission is based on the requests that are present in the transmission control queue. The transmission control queue at first processes the type of data transmission request with the highest priority. When the first position of the transmission control queue is empty, the TCA 102a may process the data transmission requests from the other queues (407, 408 and 409) in accordance with the order of type of data transmission request. In an example, the order can be communication type 402, static data attributes 403, dynamic data attributes 404, and other factors 405. The policy for ordering the queues may vary across deployments, and may be configured by the mission critical service administrator.

FIG. 5 depicts signaling control procedures for transmitting a data transmission request and associated data for one to one communication, by an MCX client 1 (501) to another MCX client 2 (502), according to various embodiments of the present disclosure. Here, 'X' refers to a type of mission critical service. The type of mission critical service can be voice, data, multimedia, and so on. The description of FIG. 5 is better understood in conjunction with FIG. 1. The signaling control procedure is for private communication between the MCX client 1 (501) and the MCX client 2 (502).

At step 1, the MCX client 1 (501) and the MCX client 2 (502) are registered, authenticated and authorized to use the MCX service. At step 2, the MCX client 1 (501) initiates transmission of an MCX data transmission request. At step 3, the MCX client 1 (501) transmits the MCX data transmission request, which can include the intended recipient MCX client 2 (502). At step 4, the TCA 102a on MCX server 500 handles the incoming MCX data transmission request and determines the procedure for transmitting the associated data to the intended recipient as described in FIG. 4.

In an embodiment, at step 5A and step 5B, the MCX server 500 transmits the data associated with the MCX data transmission request, according to an arbitration policy to the intended recipient. The associated data can be embedded in the data transmission request. If the associated data is embedded in the MCX data transmission request, there can be a reception controller 105, which may determine the other possible ways to deliver the associated data. In an example, URL is embedded with the data transmission request transmitted, instead of the associated data. From the recipient perspective, the associated data may not necessarily be included in the MCX data transmission request. The MCX client 2 (502) is notified of the incoming associated data (URL).

In an embodiment, at step 6A and step 6B, the MCX server 500 transmits the associated data by storing and including (embedding) the URL in the MCX data transmission request, according to the arbitration policy. The URL is transmitted to the MCX client 2 (502). The MCX client 2 (502) is notified about the incoming data transmission request, which is embedded with associated URL. At step 6C and step 6D, the MCX client 2 (502) may transmit an MCX fetch data transmission request to the data repository 104 to retrieve data corresponding to the received URL. The data repository 104, thereafter, delivers the data corresponding to the received URL to the MCX client 2 (502).

FIG. 6 depicts signaling control procedures for transmitting a data transmission request and associated data for one to many or group communication, by the MCX client 1 (501) to multiple MCX clients (502, 503, 504), according to various embodiments of the present disclosure. The signaling control procedure is for 1-many communication or group communication between the MCX client 1 (501) and a plurality of intended recipients. The identification of 1-many communication or group communication is performed using a Uniform Resource Identifier (URI) indicator. URI list indicates whether the communication type is 1-many or URI group communication. The indication is provided in the data transmission request from MCX client 1(501). It is to be noted that there are 'n' number of users. For the purpose of illustration, MCX client 1 (501), MCX client 2 (502), MCX client 3 (603) and MCX client n (604); have been depicted.

At step 1, the MCX clients 1 to n are registered, authenticated and authorized to use the MCX service. At step 2, the MCX client 1 (501) initiates transmission of an MCX data transmission request. At step 3, the MCX client 1 (501) transmits the MCX data transmission request, which can include the intended recipients indicated as URI list or URI group, using an MCX service identifier. At step 4, the TCA 100b in the MCX server 500 handles the incoming MCX data transmission request and determines the procedure for transmitting the associated data to the intended recipients, viz., MCX client 2 (502), MCX client 3 (603) and MCX client n (604), based on transmission control arbitration as described in FIG. 4.

In an embodiment, at step 5A, step 5B, step 7A and step 7B, the MCX server 500 transmits the data associated with the MCX data transmission request, according to an arbitration policy to the intended recipients. The associated data can be embedded in the data transmission request. If the associated data is embedded in the MCX data transmission request, there can be a reception controller 105, which may determine the other possible ways to deliver the associated data. In an example, URL is embedded with the data transmission request and transmitted, instead of the associated data. From the perspective of the recipients, the associated data may not necessarily be included in the MCX data transmission request. The MCX client 2 (502), MCX client 3 (603) and MCX client n (604), are notified of the incoming associated data (URL).

In an embodiment, at step 6A and step 6B, the MCX server 500 transmits the associated data by storing and including (embedding) the URL in the MCX data transmission request, according to the arbitration policy. The URL is transmitted to the MCX client 3 (603). The MCX client 3 (603) is notified about the incoming data transmission request, which is embedded with associated URL. At step 6C and step 6D, the MCX client 3 (603) may transmit an MCX fetch data transmission request to the data repository 104 to retrieve data corresponding to the received URL. The data repository 104, thereafter, delivers the data corresponding to the received URL to the MCX client 3 (603).

It is to be noted that although the associated data is sent to some of the intended recipients in the URI list, there can be some other recipients in the same URI list to which the URL is sent.

For group communication the intended recipient in the MCX data transmission request will include a group URI. The MCX server 500 can interact with the GMS 103 to resolve the group members of the group corresponding to group URI. The steps from 4 to 7B are same. For the sake of brevity, the contents are not repeated here.

The present disclosure can be implemented through at least one software program running on at least one hardware device and performing network management functions to control the network elements. The network elements shown in FIG. 1-6 include blocks which can be at least one of a hardware device, or a combination of hardware device and software module.

The present disclosure describes a method and system for transmission control in a network supporting MC services. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the present disclosure may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method of transmission control and arbitration by a server in a wireless communication system, the method comprising:
   receiving a request for mission critical (MC) data transmission from a user equipment (UE); and
   processing the request based on a priority of a queue associated with the request among a plurality of queues, the queue being associated with the request based on a type of the request,
   wherein the plurality of the queues comprise a transmission control queue, a communication type queue, a static attribute queue, and a dynamic attribute queue.

2. The method of claim 1,
   wherein the transmission control queue is a queue from which the request is processed for data transmission at a highest priority, and
   wherein the request with an emergency communication request type is associated with the transmission control queue.

3. The method of claim 1,
   wherein the communication type queue corresponds to a communication type of the request, and
   wherein the communication type of the request comprises at least one of group communication type, private communication type, or 1-to-many communication type.

4. The method of claim 1,
   wherein the static attribute queue corresponds to static attributes of the request, and
   wherein the static attributes of the request comprise at least one of group priority or user priority.

5. The method of claim 1,
   wherein the dynamic attribute queue corresponds to dynamic attributes of the request, and
   wherein the dynamic attributes of the request comprise at least one of location of the UE or size of data corresponding to the request.

6. The method of claim 1, wherein priorities of the plurality of queues are in descending order of the transmission control queue, the communication type queue, the static attribute queue, and the dynamic attribute queue.

7. The method of claim 1, wherein the processing of the request based on the priority of the queue associated with the request comprises:
   transmitting data corresponding to the request via unicast or broadcast immediately in case that the request is identified to be an auto-send request based on a size of the data; and
   transmitting the data based on the priority of the queue associated with the request in case that the request is not identified to be the auto-send request based on the size of the data.

8. The method of claim 1, further comprising:
   transmitting data corresponding to the request based on a result of the processing to at least one UE.

9. The method of claim 8, wherein the transmitting of the data corresponding to the request comprises:
   based on a policy of the server, storing the data in the server and transmitting a Universal Resource Locator (URL) corresponding to the data to the at least one UE.

10. The method of claim 8, wherein the transmitting of the data corresponding to the request comprises:
    based on a policy of the server, transmitting the data to the at least one UE.

11. A server for transmission control and arbitration in a wireless communication system, the server comprising:
    a transceiver; and
    a controller coupled to the transceiver and configured to:
      receive a request for mission critical (MC) data transmission from a user equipment (UE); and
      process the request based on a priority of a queue associated with the request among a plurality of queues, the queue being associated with the request based on a type of the request,
    wherein the plurality of the queues comprise a transmission control queue, a communication type queue, a static attribute queue, and a dynamic attribute queue.

12. The server of claim 11,
    wherein the transmission control queue is a queue from which the request is processed for data transmission at a highest priority, and
    wherein the request with an emergency communication request type is associated with the transmission control queue.

13. The server of claim 11,
    wherein the communication type queue corresponds to a communication type of the request, and
    wherein the communication type of the request comprises at least one of group communication type, private communication type, or 1-to-many communication type.

14. The server of claim 11,
    wherein the static attribute queue corresponds to static attributes of the request, and
    wherein the static attributes of the request comprise at least one of group priority or user priority.

15. The server of claim 11,
wherein the dynamic attribute queue corresponds to dynamic attributes of the request, and
wherein the dynamic attributes of the request comprise at least one of location of the UE or size of data corresponding to the request.

16. The server of claim 11, wherein priorities of the plurality of queues are in descending order of the transmission control queue, the communication type queue, the static attribute queue, and the dynamic attribute queue.

17. The server of claim 11, wherein the controller is further configured to:
transmit data corresponding to the request via unicast or broadcast immediately in case that the request is identified to be an auto-send request based on a size of the data, and
transmit the data based on the priority of the queue associated with the request in case that the request is not identified to be the auto-send request based on the size of the data.

18. The server of claim 11, the controller is further configured to transmit data corresponding to the request based on a result of the processing to at least one UE.

19. The server of claim 18, wherein the controller is further configured to, based on a policy of the server, store the data in the server and transmitting a Universal Resource Locator (URL) corresponding to the data to the at least one UE.

20. The server of claim 18, wherein the controller is further configured to, based on a policy of the server, transmit the data to the at least one UE.

* * * * *